US011905842B2

(12) United States Patent
Sharma et al.

(10) Patent No.: US 11,905,842 B2
(45) Date of Patent: Feb. 20, 2024

(54) PARTITION DAMPER SEAL CONFIGURATIONS FOR SEGMENTED INTERNAL COOLING HARDWARE

(71) Applicants: General Electric Company, Schenectady, NY (US); General Electric Deutschland Holding GmbH, Frankfurt (DE)

(72) Inventors: Ashish Sharma, Garching (DE); Tomasz Edward Berdowski, Warsaw (PL); Maciej Czerwiński, Warsaw (PL); Katarzyna Anna Mikolajczyk, Warsaw (PL); Raymond Floyd Martell, Evendale, OH (US); Tomasz Jan Bulsiewicz, Warsaw (PL)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 17/553,513

(22) Filed: Dec. 16, 2021

(65) Prior Publication Data

US 2023/0193784 A1 Jun. 22, 2023

(51) Int. Cl.
*F01D 25/26* (2006.01)
*F01D 11/00* (2006.01)
(Continued)

(52) U.S. Cl.
CPC ............. *F01D 25/26* (2013.01); *F01D 11/00* (2013.01); *F01D 25/04* (2013.01); *F01D 25/12* (2013.01);
(Continued)

(58) Field of Classification Search
CPC ........ F01D 11/005; F01D 5/189; F01D 9/041; F01D 5/284; F01D 9/065; F01D 9/042;
(Continued)

(56) References Cited

U.S. PATENT DOCUMENTS 7,360,769 B2 4/2008 Bennett
8,016,549 B2 * 9/2011 Shah ................. G10K 11/24
277/650
(Continued)

OTHER PUBLICATIONS

United States Patent and Trademark Office, "Office Action", issued in connection with U.S. Appl. No. 16/858,277 dated Oct. 22, 2021, 11 pages.
(Continued)

*Primary Examiner* — Eric J Zamora Alvarez
(74) *Attorney, Agent, or Firm* — Hanley, Flight & Zimmerman, LLC

(57) ABSTRACT

Partition damper seal configurations for segmented internal cooling hardware apparatus are disclosed. An example apparatus includes an inner wall and an outer wall, the outer wall spaced apart from the inner wall in a radial direction, a space between the inner and outer walls defining a flow passage, and a body positioned between the inner and outer walls, the body traversing the inner and outer walls in an axial direction and attached to an inner surface of the outer wall and an outer surface of the inner wall, the body to detach from the inner and outer surfaces and to at least partially seal the flow passage in response to the outer wall moving relative to the inner wall.

20 Claims, 12 Drawing Sheets

(51) Int. Cl.
*F01D 25/04* (2006.01)
*F01D 25/12* (2006.01)
*F01D 25/14* (2006.01)
*B33Y 80/00* (2015.01)
*F01D 5/16* (2006.01)
*F01D 5/26* (2006.01)
*F01D 9/04* (2006.01)
*F01D 5/14* (2006.01)
*F01D 9/06* (2006.01)
*F01D 25/24* (2006.01)

(52) U.S. Cl.
CPC .............. *F01D 25/14* (2013.01); *B33Y 80/00* (2014.12); *F05D 2240/126* (2013.01); *F05D 2240/14* (2013.01); *F05D 2240/55* (2013.01); *F05D 2250/182* (2013.01); *F05D 2260/20* (2013.01); *F05D 2260/96* (2013.01)

(58) Field of Classification Search
CPC .......... F01D 25/12; F01D 25/14; F01D 5/147; F01D 5/282; F01D 9/044; F01D 11/006; F01D 25/26; F01D 11/003; F01D 25/04; F01D 25/06; F01D 5/16; F01D 5/18; F01D 9/02; F01D 17/04; F01D 25/243; F01D 5/146; F01D 5/186; F01D 5/188; F01D 5/22; F01D 5/24; F01D 11/00; F01D 11/025; F01D 5/26; F05D 2300/6033; F05D 2240/14; F05D 2240/55; F05D 2220/32; F05D 2260/20; F05D 2260/96; F05D 2300/603; F05D 2240/126; F05D 2250/182; F05D 2260/36; F05D 2260/941; B33Y 80/00
See application file for complete search history.

(56) References Cited

U.S. PATENT DOCUMENTS

| | | | |
|---|---|---|---|
| 8,926,262 B2* | 1/2015 | Tanahashi | F01D 5/282 416/241 B |
| 9,341,072 B2 | 5/2016 | Hanumanthan et al. | |
| 9,810,096 B2 | 11/2017 | Evans et al. | |
| 9,920,429 B2 | 3/2018 | Carlsten et al. | |
| 10,174,636 B2 | 1/2019 | Zierer et al. | |
| 10,788,211 B2 | 9/2020 | Pettersson et al. | |
| 10,914,185 B2 | 2/2021 | Bonacum et al. | |
| 11,203,981 B1* | 12/2021 | Propheter-Hinckley | F01D 11/003 |
| 2011/0081235 A1 | 4/2011 | Shah et al. | |
| 2012/0186269 A1 | 7/2012 | Cihlar et al. | |
| 2016/0023272 A1 | 1/2016 | Mongillo, Jr. et al. | |
| 2016/0177761 A1 | 6/2016 | Huizenga et al. | |
| 2020/0025025 A1* | 1/2020 | Sippel | F01D 9/041 |
| 2020/0080611 A1 | 3/2020 | Blank et al. | |
| 2021/0332756 A1 | 10/2021 | Sharma et al. | |

OTHER PUBLICATIONS

United States Patent and Trademark Office, "Office Action", issued in connection with U.S. Appl. No. 16/858,277 dated Jul. 8, 2021, 7 pages.

\* cited by examiner

PARTITION DAMPER SEAL CONFIGURATIONS FOR SEGMENTED INTERNAL COOLING HARDWARE

FIELD OF THE DISCLOSURE

This disclosure relates generally to double walled airfoils and, more particularly, to partition damper seal configurations for segmented internal cooling hardware.

BACKGROUND

Airfoils typically contain internal structures for a flow passage to provide cooled air to the structures. The internal structures are subject to high temperatures. Engine airfoils often utilize cooling fluid to limit effects of a high thermal gradient on the airfoil and associated components.

Figure 1:
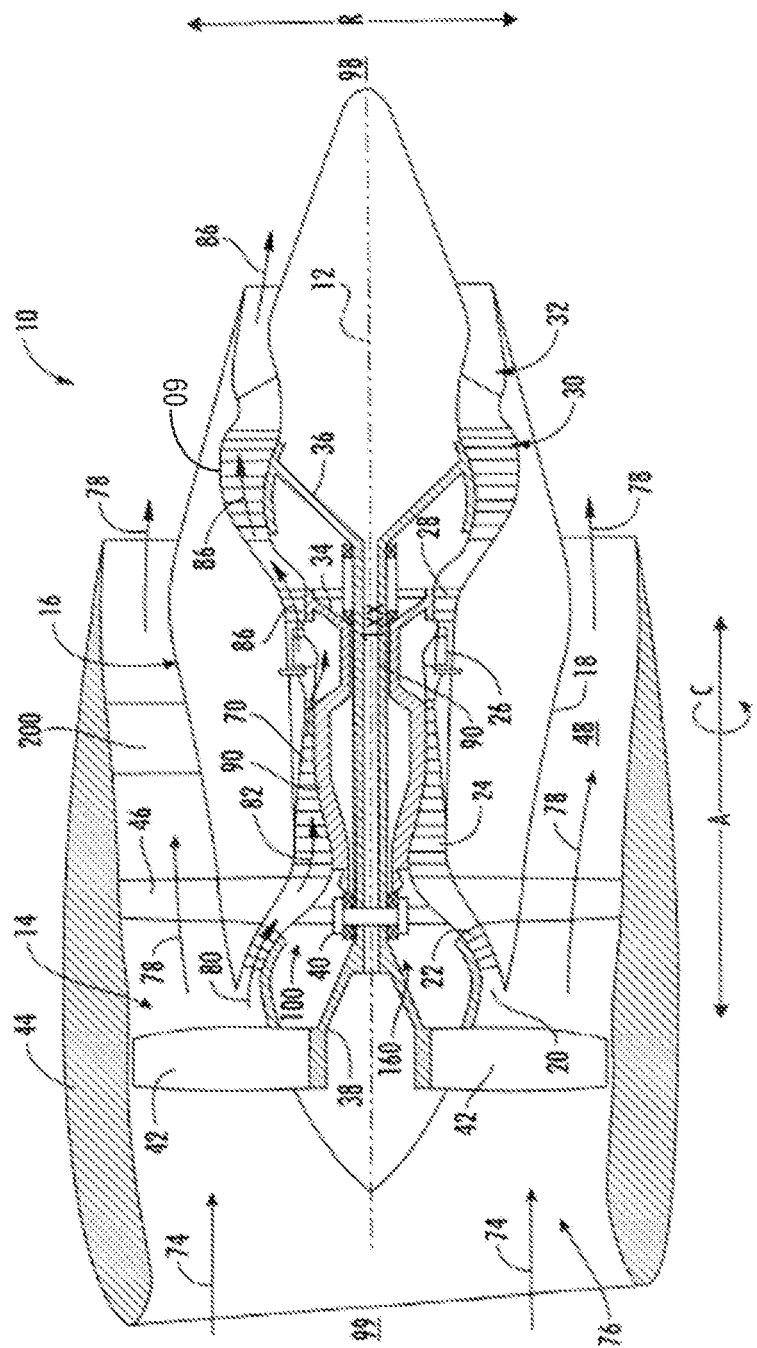
FIG. 1 is a cross-sectional view of an example turbofan gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

DETAILED DESCRIPTION

A typical aircraft engine will generate excessive heat via combustion in operation. An aircraft engine will utilize a cooling system to cool engine components that reach relatively high temperatures. An engine's structural hardware is designed to support internal flow passages, with internal holes and passages, to allow cooling fluid to access high temperature components. However, the engine's structural hardware lacks the ability to define and control a variety of temperature zones throughout various sections of the internal hardware, resulting in a high thermal gradient between internal components. Further, the high thermal gradients in an engine's hardware inhibits the reliability and life of a given component and, thus, the reliability and life of the aircraft engine.

In operation, an aircraft engine casing experiences relatively high amounts of vibration and noise. Excessive vibration between components of an engine's internal hardware results in considerable stress concentrations as well as accelerated part damage and reduction in engine life. In particular, associated (e.g., close, proximate, etc.) components of an engine's hardware are susceptible to such vibrations and subsequent damage.

To address some of the issues presented by known engine casings and internal hardware, examples disclosed herein provide partition damper seal configurations for segmented internal cooling hardware. In certain examples, an airfoil (e.g., an engine casing) includes an inner wall (e.g., inner band) and an outer wall (e.g., outer band), the outer wall spaced apart from the inner wall in a radial direction. In certain examples, a space between the inner and outer walls defines a flow passage (e.g., cooling fluid cavity). In certain examples, a body (e.g., wire, damping mechanism, rib, etc.) is positioned between the inner and outer walls. In certain examples, the body extends in a radial direction and traverses the inner and outer walls. In certain examples, the body is detachably coupled to an inner surface of the outer wall and an outer surface of the inner wall. In certain examples, the body is integral to the airfoil. In certain examples, the body detaches from the inner and outer surfaces to at least partially seal the flow passage. In certain examples, the body detaches in response to the outer wall moving relative to the inner wall (e.g., vibration of the airfoil, thermal expansion, etc.).

In some examples, a first notch is disposed on the inner surface and opposes a second notch on the outer surface. Additionally or alternatively, the body is positioned between the notches. In some examples, the body contacts the first and second notches to seal the flow passage. In some examples, the body is a rib disposed on the inner surface or the outer surface. In some examples, the rib is positioned on a surface opposing a second rib and a third rib, wherein the second or the third rib contact the body to seal the flow passage. In some examples, the body is a damping mechanism between the inner and outer walls.

In some examples, the body is a three-dimensional (3D) printed wire. Accordingly, the 3D printed wire is integral to the inner and outer surfaces of the walls. In some examples, a plurality of bodies is arranged and distributed between the inner and outer walls. In some examples, the plurality of bodies detaches from the inner and outer surfaces in response to the inner wall moving relative to the outer wall. In some examples, the plurality of bodies seals the flow passage.

In some examples, the flow passage includes apertures extending through the inner and outer walls. Accordingly, the flow passage can be implemented as a cooling system for the airfoil. In some examples, the inner wall moves relative to the outer wall due to the thermal expansion of the airfoil (e.g., during engine operation).

Example partition damper seal configurations disclosed herein can be applied to closed rotor engine designs. For purposes of illustration only, FIG. 1 illustrates an example closed rotor turbofan engine.

FIG. 1 is a cross-sectional view of a turbofan gas turbine engine in which examples disclosed herein may be implemented. Referring now to the drawings, FIG. 1 is a schematic partially cross-sectioned side view of an exemplary gas turbine engine 10 as may incorporate various examples of the present disclosure. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14. For reference, the engine 10 defines the axial direction A, a radial direction R, and a circumferential direction C. In general, the axial direction A extends parallel to the axial centerline axis 12, the radial direction R extends outward from and inward to the axial centerline axis 12 in a direction orthogonal to the axial direction A, and the circumferential direction extends three hundred sixty degrees (360°) around the axial centerline axis 12.

The core engine 16 may generally include a substantially tubular outer casing 18 that defines an annular core inlet 20. The outer casing 18 encases or at least partially forms, in serial flow relationship, a compressor section having a booster or low pressure (LP) compressor 22, a high pressure (HP) compressor 24, a heat addition system 26, an expansion section or turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In certain examples, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a fan flow passage 48 therebetween. However, it should be appreciated that various configurations of the engine 10 may omit the nacelle 44, or omit the nacelle 44 from extending around the fan blades 42, such as to provide an open rotor or propfan configuration of the engine 10.

It should be appreciated that combinations of the shafts 34, 36, the compressors 22, 24, and the turbines 28, 30 define a rotor assembly 90 of the engine 10. For example, the HP shaft 34, HP compressor 24, and HP turbine 28 may define a high speed or HP rotor assembly of the engine 10. Similarly, combinations of the LP shaft 36, LP compressor 22, and LP turbine 30 may define a low speed or LP rotor assembly of the engine 10. Various examples of the engine 10 may further include the fan shaft 38 and fan blades 42 as the LP rotor assembly. In certain examples, the engine 10 may further define a fan rotor assembly at least partially mechanically de-coupled from the LP spool via the fan shaft 38 and the reduction gear 40. Still further examples may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrow 80, enters the core engine 16 through the core inlet 20 defined at least partially via the outer casing 18. The flow of air is provided in serial flow through the compressors, the heat addition system, and the expansion section via a core flowpath 70. The flow of air 80 is increasingly compressed as it flows across successive stages of the compressors 22, 24, such as shown schematically by arrows 82. The compressed air 82 enters the heat addition system 26 and mixes with a liquid and/or gaseous fuel and is ignited to produce combustion gases 86. It should be appreciated that the heat addition system 26 may form any appropriate system for generating combustion gases, including, but not limited to, deflagrative or detonative combustion systems, or combinations thereof. The heat addition system 26 may include annular, can, can-annular, trapped vortex, involute or scroll, rich burn, lean burn, rotating detonation, or pulse detonation configurations, or combinations thereof.

The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the fan flow passage 48, such as shown schematically by arrows 78.

It should be appreciated that FIG. 1 depicts and describes a two-stream engine having the fan flow passage 48 and the core flowpath 70. The example depicted in FIG. 1 has the nacelle 44 surrounding the fan blades 42, such as to provide noise attenuation, blade-out protection, and other benefits known for nacelles, and which may be referred to herein as a "ducted fan," or the entire engine 10 may be referred to as a "ducted engine."

Figure 2:
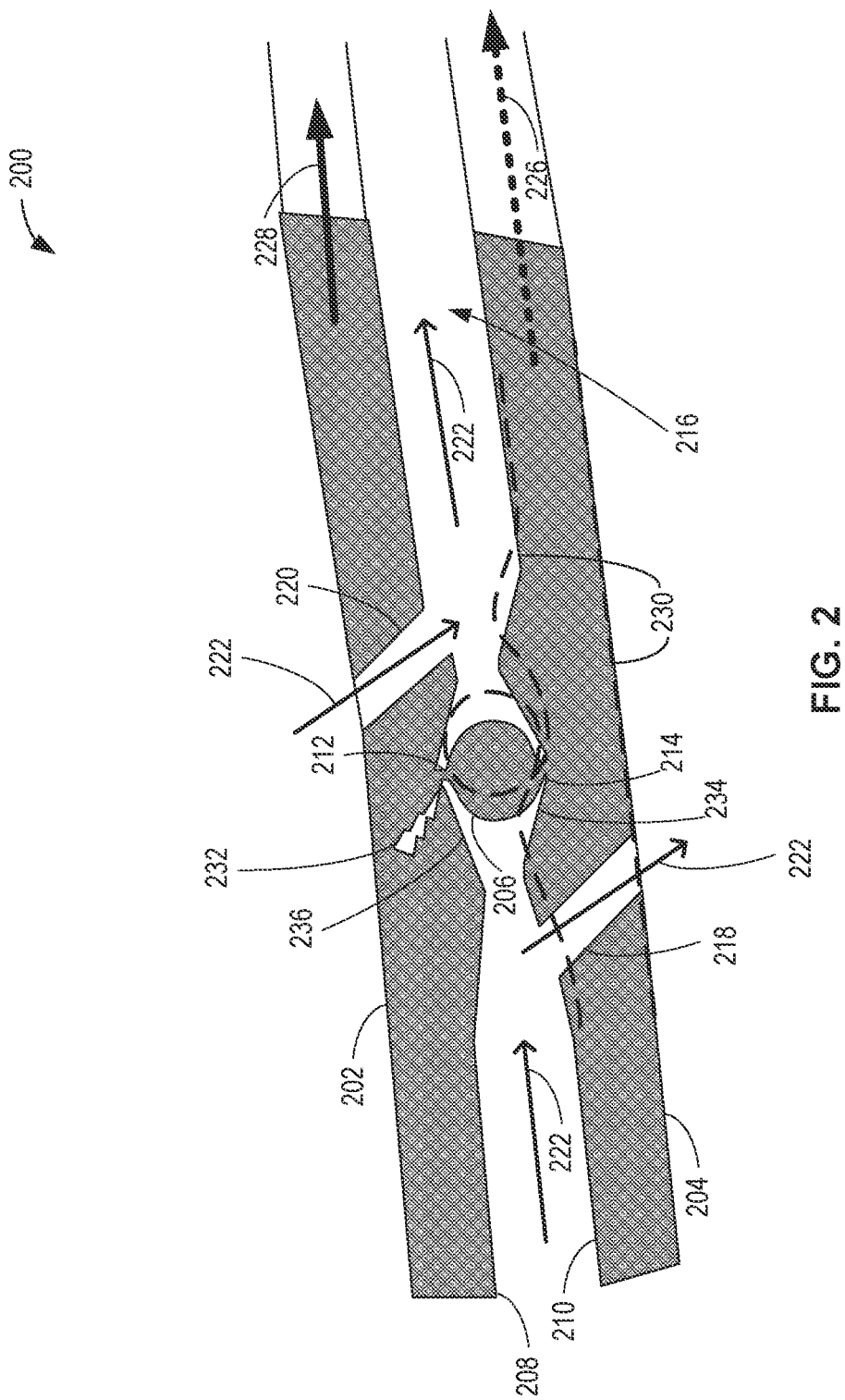
FIG. 2 is a cross-sectional view of an example sealing configuration that can be implemented in examples disclosed herein.

FIG. 2 is a cross-sectional view of an example sealing configuration 200. An example sealing configuration 200 includes an inner wall 202 and an outer wall 204. In some examples, the inner wall 202 and the outer wall 204 define an airfoil (e.g., engine casing, turbine shroud, combustor liner, rotor passage, the nacelle 44 of FIG. 1, the outer casing 18 of FIG. 1, etc.). The inner wall 202 and the outer wall 204 are spaced apart in a radial direction. In the example as depicted in FIG. 2, a body 206 is positioned between the inner wall 202 and the outer wall 204. The example body 206 is disposed on an outer surface 208 of the inner wall 202 and an inner surface 210 of the outer wall 204. Additionally or alternatively, the body 206 connects to the inner wall 202 and the outer wall 204 via a ligament 212 and a ligament 214, respectively.

In this example, the space between the inner wall 202 and the outer wall 204 defines a flow passage 216. The flow passage 216 has a first aperture 220 extending through the inner wall 202 and a second aperture 218 extending through the outer wall 204. In some examples, the apertures 218, 220 permit fluid flow to regions of an engine's internal hardware via the flow passage 216, in directions as generally indicated by arrows 222.

In the illustrated example, the outer wall 204 moves relative to the inner wall 202. For example, the inner wall 202 can thermally deflect in a direction as generally indicated by an arrow 228 and the outer wall 204 can thermally deflect in a direction as generally indicated by an arrow 226. The amount of the thermal expansion of the outer wall 204 is greater than the amount of the thermal expansion of the inner wall 202. Thus, the deflection of the outer wall 204 results in a second relative position of the outer wall 204 as depicted by outlines 230.

In the illustrated example of FIG. 2, the example body 206 is detachably coupled to the inner wall 202 and the outer wall 204 via the ligaments 212 and 214. In FIG. 2, the ligaments 212 and 214 are detachable (e.g., removable) connections between the body 206 and the walls 202, 204. In response to the outer wall 204 moving relative to the inner wall 202, a stress point 232 can occur at the ligament 212 such that the body 206 detaches from at least one of the outer wall 204 or the inner wall 202. The example outlines 230 depict the movement of the body 206 from a first location to a second relative location. In this example, the body 206 remains attached to the outer wall 204. In other examples, the body 206 detaches from both walls 202 and 204.

In the illustrated example, the surfaces 210 and 208 have a notch 234 and a notch 236, respectively, that extend into the flow passage 216. The body 206 is positioned between the notches 234 and 236. In response to the outer wall 204 moving relative to the inner wall 202, the body 206 contacts the notches 234 and 236 to at least partially seal (e.g., partially seal, fully seal, partially close, close, etc.) the flow passage 216.

Additionally or alternatively, the example body 206 can dampen (e.g., resist) the movement of the walls 202 and 204. For example, relatively high external forces (e.g., vibration, pressure, torque, etc.) within an example airfoil can exert variable force on at least one of the walls 202 or 204. In the example of FIG. 1, the body 206 can absorb (e.g., mitigate, dampen, etc.) forces exerted on the walls 202 and 204. Accordingly, the example body 206 can prevent damage of the walls 202 and 204 from external forces.

Figure 3:
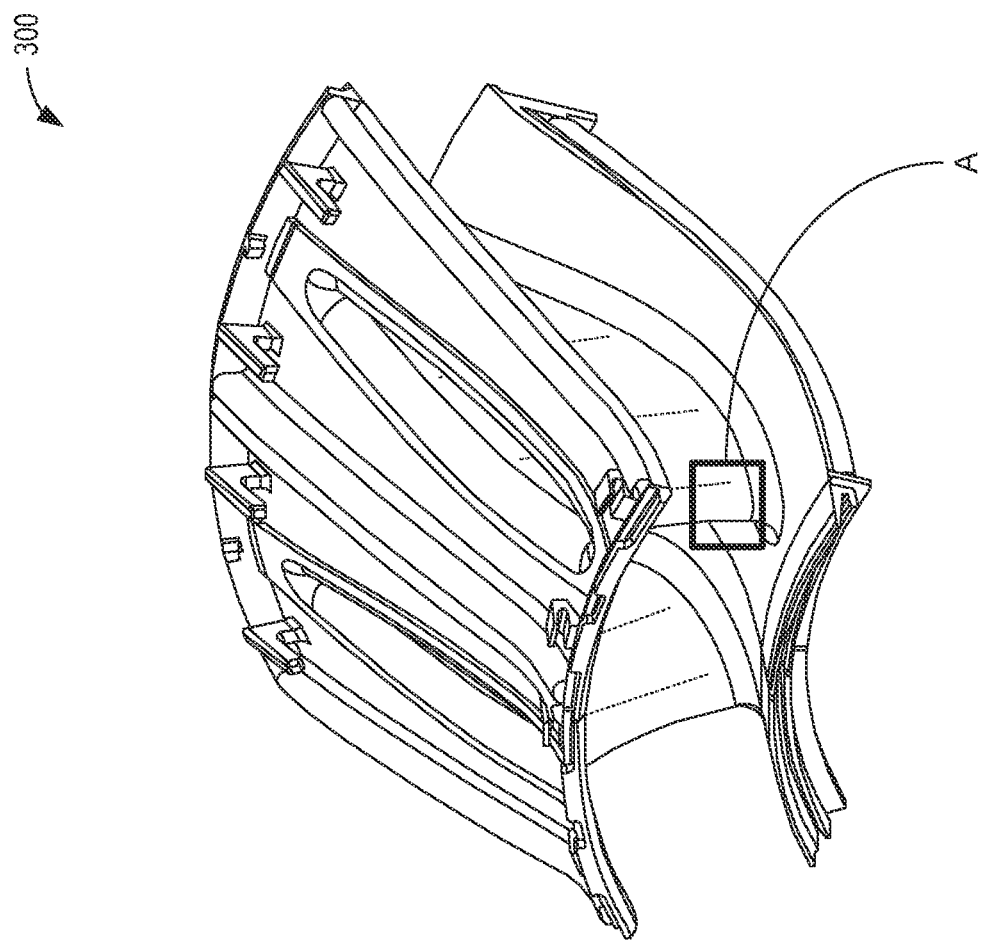
FIG. 3 illustrates an isometric view of an example strut fairing that can be implemented in examples disclosed herein.

FIG. 3 illustrates an isometric view of an example strut fairing 300 in which examples disclosed herein can be implemented. The example strut fairing 300 can be mounted in an engine casing. In this example, view A is a location of an example double walled airfoil of the strut fairing 300 that will be described in further detail in FIG. 4.

Figure 4:
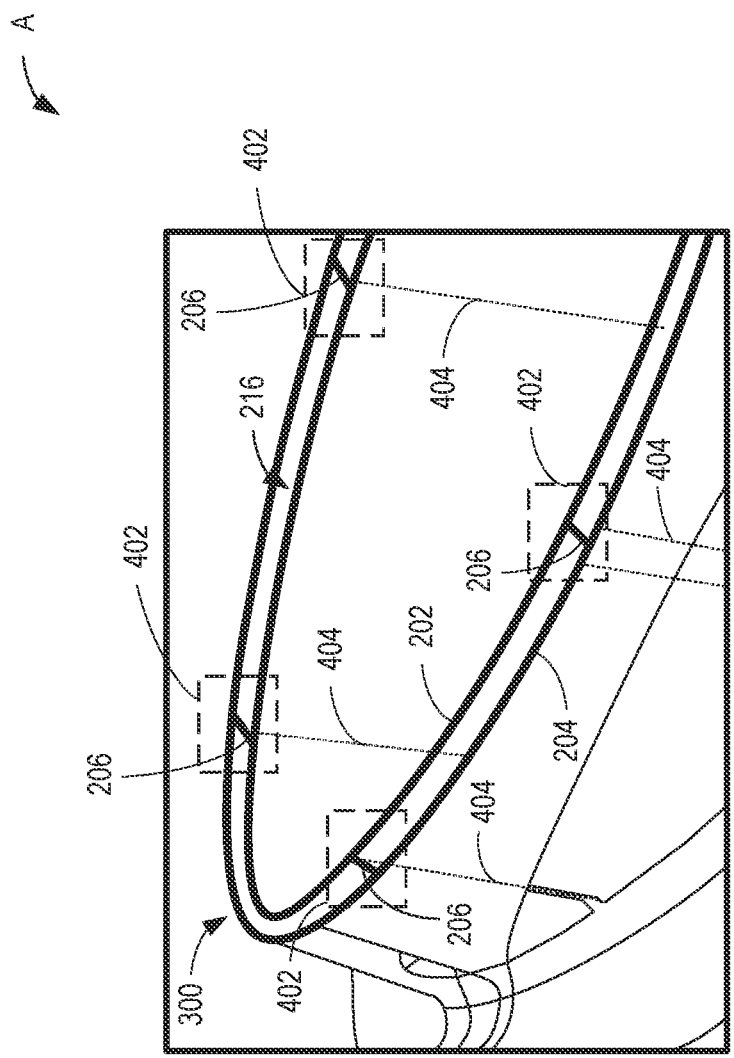
FIGS. 4 and 5 are cross-sectional views of the example fairing of FIG. 3.
Figure 5:
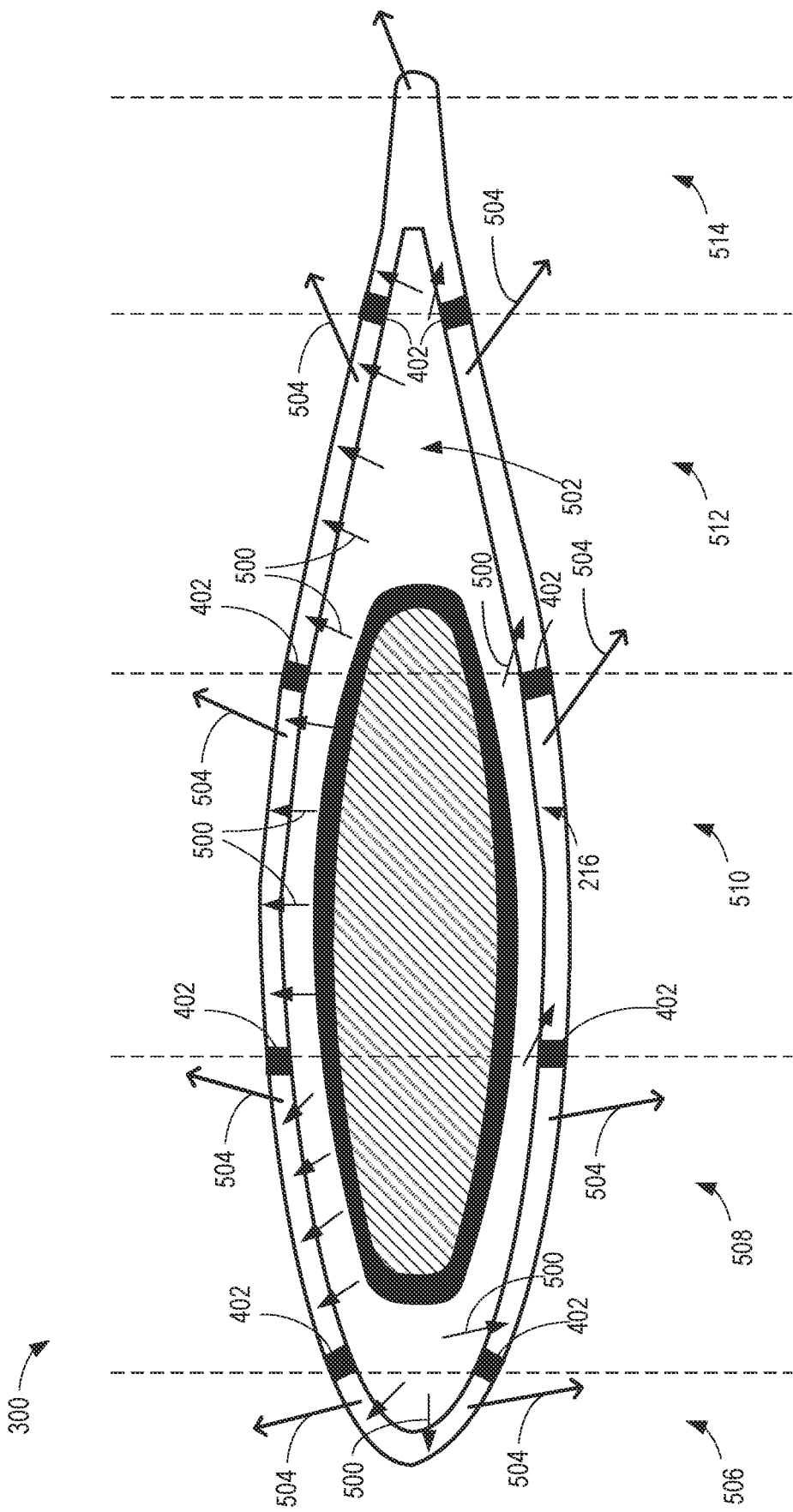

FIGS. 4 and 5 are cross-sectional views of the example strut fairing 300 of FIG. 3. FIG. 4 illustrates a partial view of the strut fairing 300. In particular, FIG. 4 illustrates the strut fairing 300 at view A of FIG. 3.

In the illustrated example of FIG. 4, the strut fairing 300 has example sealing configurations 402. The example sealing configurations 402 of FIG. 4 are similar to the example sealing configuration 200 of FIG. 2, but, instead, includes a plurality of sealing configurations 402 distributed throughout the strut fairing 300. In some examples, the example sealing configuration 200 can be implemented as the example sealing configuration 402. The sealing configurations 402 have bodies 206 positioned between the walls 202 and 204 and traverse the walls 202 and 204 in an axial direction, as generally indicated by lines 404.

The example strut fairing 300 includes a plurality of bodies 206 distributed between the inner wall 202 and the outer wall 204. Accordingly, the example sealing configurations 402 can at least partially seal the flow passage 216 in response to the outer wall 204 moving relative to (e.g., thermally expanding relative to) the inner wall 202.

FIG. 5 is another cross-sectional view of the example strut fairing 300 of FIG. 3. In illustrated example of FIG. 5, the inflow of fluid (e.g., cooling fluid, air, etc.) moves into the flow passage 216 in a direction as generally indicated by arrows 500. In some examples, a pressurized cavity 502 pushes the fluid into the flow passage 216 corresponding to the direction of the arrows 500. Fluid moves out of the flow passage 216 in a direction as generally indicated by arrows 504.

The arrangement of the example sealing configurations 402 define zones 506, 508, 510, 512, and 514 (e.g., temperature zones) of the strut fairing 300. In some examples, at least one of the zones 506, 508, 510, 512, and 514 may need to be a substantially different temperature (e.g., substantially higher temperature, substantially lower temperature, etc.) based on a design or an application of the strut fairing 300.

Figure 6:
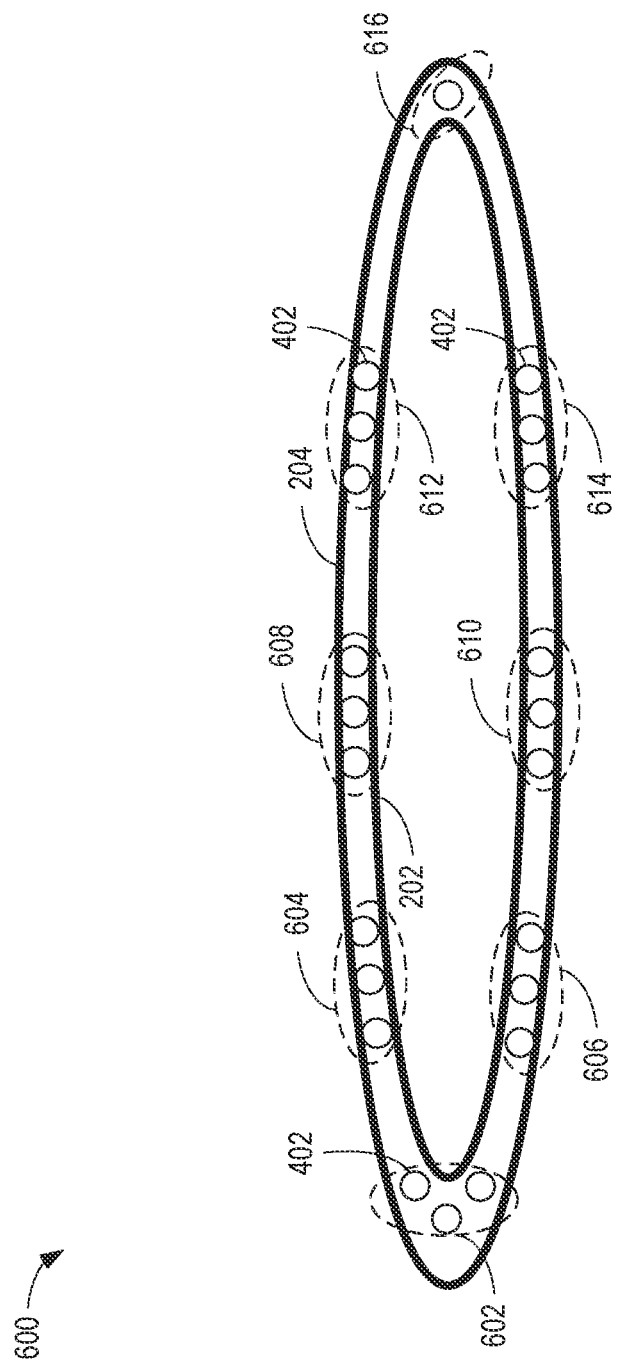
FIG. 6 illustrates an example airfoil that can be implemented in examples disclosed herein.

FIG. 6 is an example airfoil 600 that can be implemented in accordance with the teachings of the present disclosure. The example airfoil 600 of FIG. 6 is similar to the strut fairing 300 of FIGS. 3, 4, and 5, but, instead, includes a plurality of sealing configurations 402 distributed in groups 602, 604, 606, 608, 610, 612, 614, and 616 throughout the inner wall 202 and the outer wall 204. In some examples, groups 602, 604, 606, 608, 610, 612, 614, and 616 can provide multiple sealing and damping functions for the example airfoil 600. For example, group 602, with multiple sealing configurations 402, can provide a greater degree of sealing and/or damping relative to group 616, with a singular sealing configuration 402.

Figure 7:
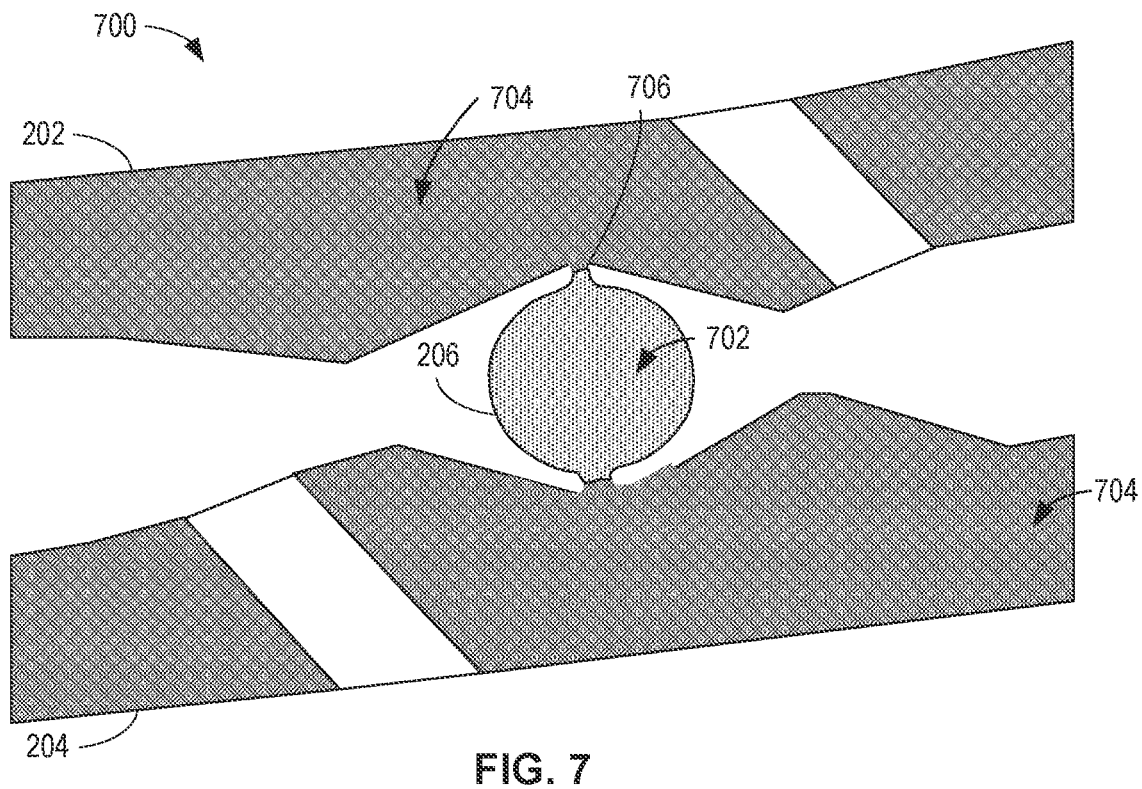
FIGS. 7 and 8 illustrate example sealing configurations that can be implemented in examples disclosed herein.

FIG. 7 is a cross-sectional view of an example sealing configuration 700 that can be implemented in accordance with the teachings of the present disclosure. The example sealing configuration 700 of FIG. 7 is similar to the example sealing configuration 200 of FIG. 2, but, instead, includes a body 206 with a first material 702, and the walls 202 and 204 having a second material 704. The second material 704 corresponds to the walls 202 and 204, and the first material 702 corresponds to the body 206. In operation, the movement of the walls 202 and 204 can result in a stress concentration at point 706 due to a connection between first material 702 and the second material 704.

Figure 8:
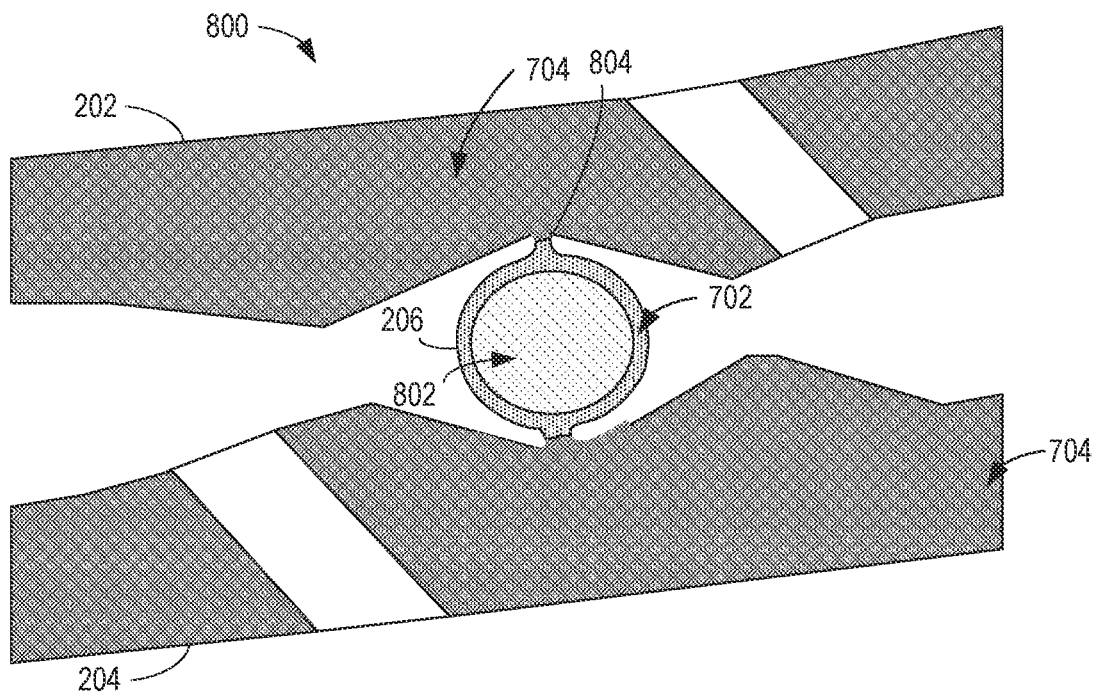

FIG. 8 is a cross-sectional view of an example sealing configuration 800 that can be implemented in accordance with the teachings of the present disclosure. The example sealing configuration 800 of FIG. 8 is similar to the example sealing configuration 700 of FIG. 7, but, instead, includes a body 206 with a third material 802. The third material 802 can be a flexible (e.g., relatively soft, damping, etc.) core of the body 206. In some examples, the first material 702 can be a wear resistant layer of the body 206. In operation, the movement of the walls 202 and 204 can result in a relatively high stress concentration at point 804 due to a connection between first material 702 and the second material 704.

Figure 9:
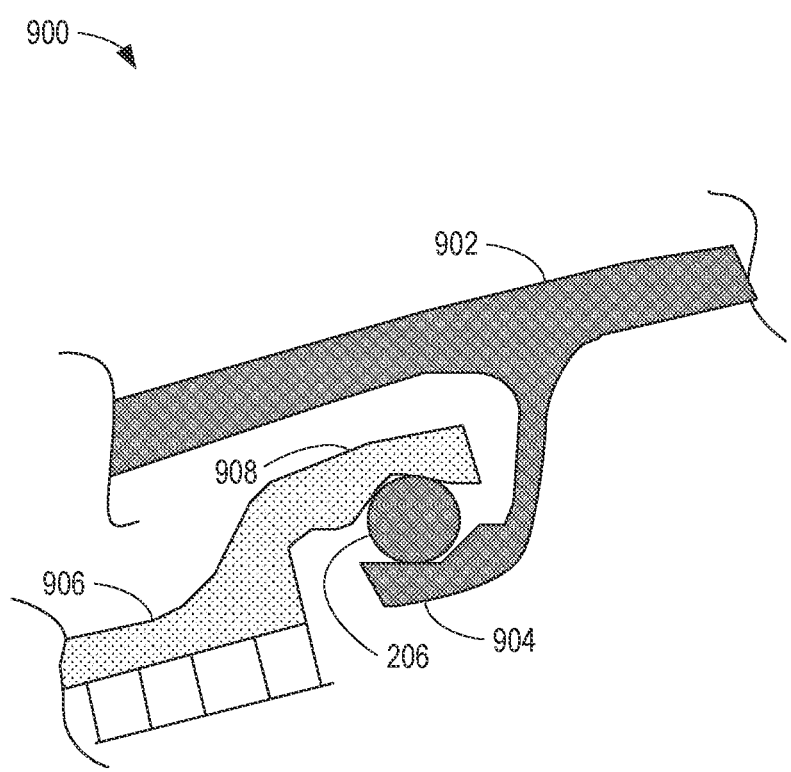
FIG. 9 illustrates an example shroud hanger sealing configuration in an example engine casing assembly that can be implemented in examples disclosed herein.

FIG. 9 is a cross-sectional view of an example shroud hanger sealing configuration 900 that can be implemented in accordance with the teachings of the present disclosure. In some examples, the shroud hanger sealing configuration 900 can be included in an engine casing assembly. The example shroud hanger sealing configuration 900 of FIG. 9 is similar to the example sealing configuration 200 of FIG. 2, but instead includes a first structure 902 having an outer wall 904 and a second structure 906 having an inner wall 908. The body 206 is positioned between the outer wall 904 and the inner wall 908. In some examples, the first structure 902 can be a wall of an engine's hardware (e.g., shroud wall, hanger wall, casing wall, a wall of the nacelle 44 of FIG. 1, a wall of the outer casing 18 of FIG. 1, etc.) that is different from the second structure 906. Accordingly, the body 206 can be at least one of a sealing mechanism or a damping mechanism for structures 902, 906 (e.g., casing, fairing, shroud, hanger, etc.) within an engine's hardware.

Figure 10:
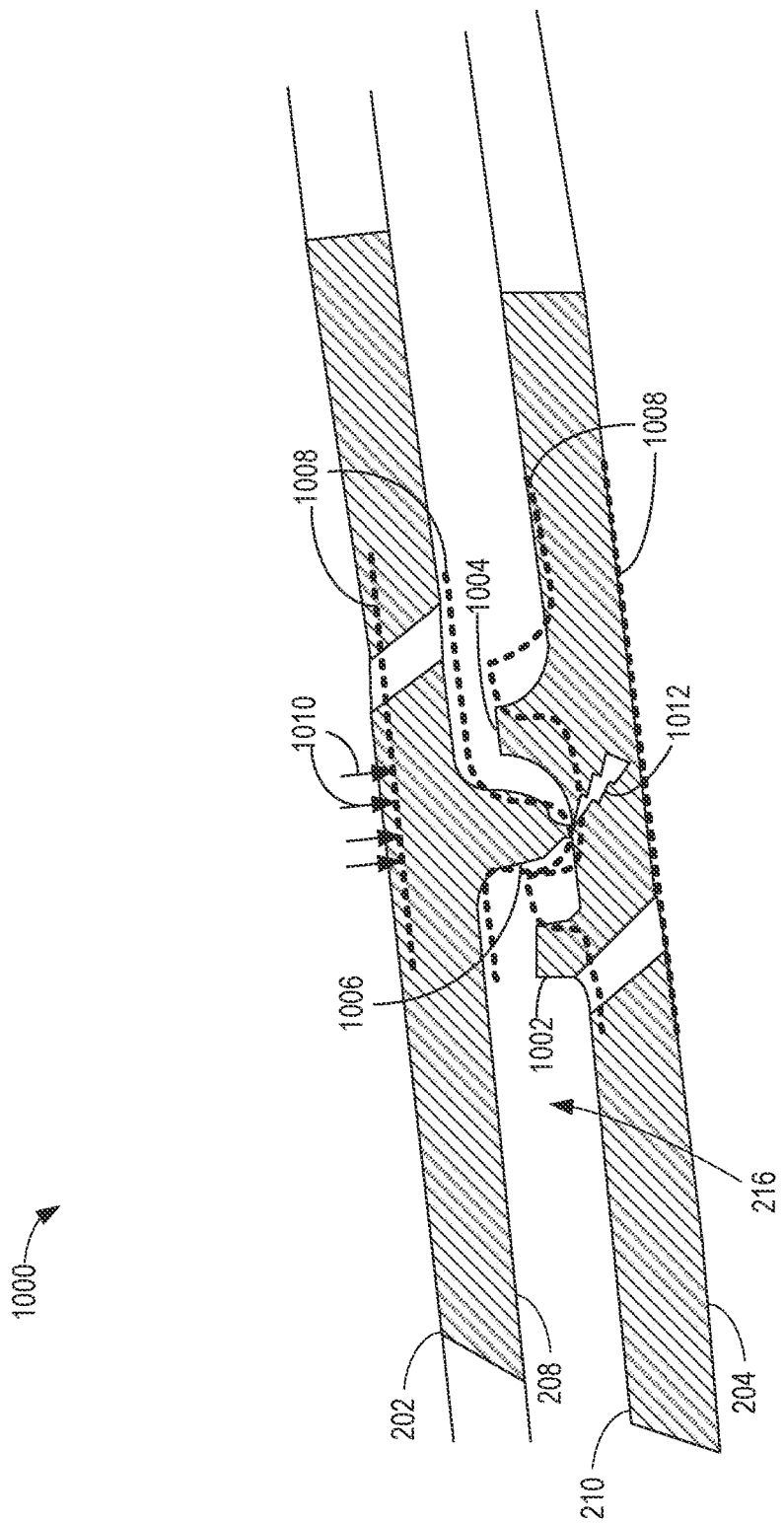
FIG. 10 illustrates another example sealing configuration that can be implemented in examples disclosed herein.

FIG. 10 is a cross-sectional view of an example sealing configuration 1000 that can be implemented in examples disclosed herein. The example sealing configuration 1000 of FIG. 10 is similar to the example sealing configuration 200 of FIG. 2, but, instead, includes ribs 1002 and 1004 disposed on the inner surface 210 of the outer wall 204 and a rib 1006 disposed (e.g., positioned) on the outer surface 208 of the inner wall 202. The rib 1006 is positioned between the ribs 1002 and 1004. In response to the inner wall 202 moving relative to the outer wall 204, the rib 1006 contacts the ribs 1002 and 1004 to at least partially seal (e.g., fully seal, partially close, close, etc.) the flow passage 216, as depicted by outlines 1008.

Additionally or alternatively, the example rib 1006 can dampen (e.g., resist) the movement of the walls 202 and 204. Example forces, exerted in a direction as generally indicated by arrows 1010 on at least one of the walls 202 or 204, can result in a stress concentration point 1012. Accordingly, the example rib 1006 can support (e.g., counter act the force on) the walls 202 and 204 from overpressure due to external forces.

Figure 11:
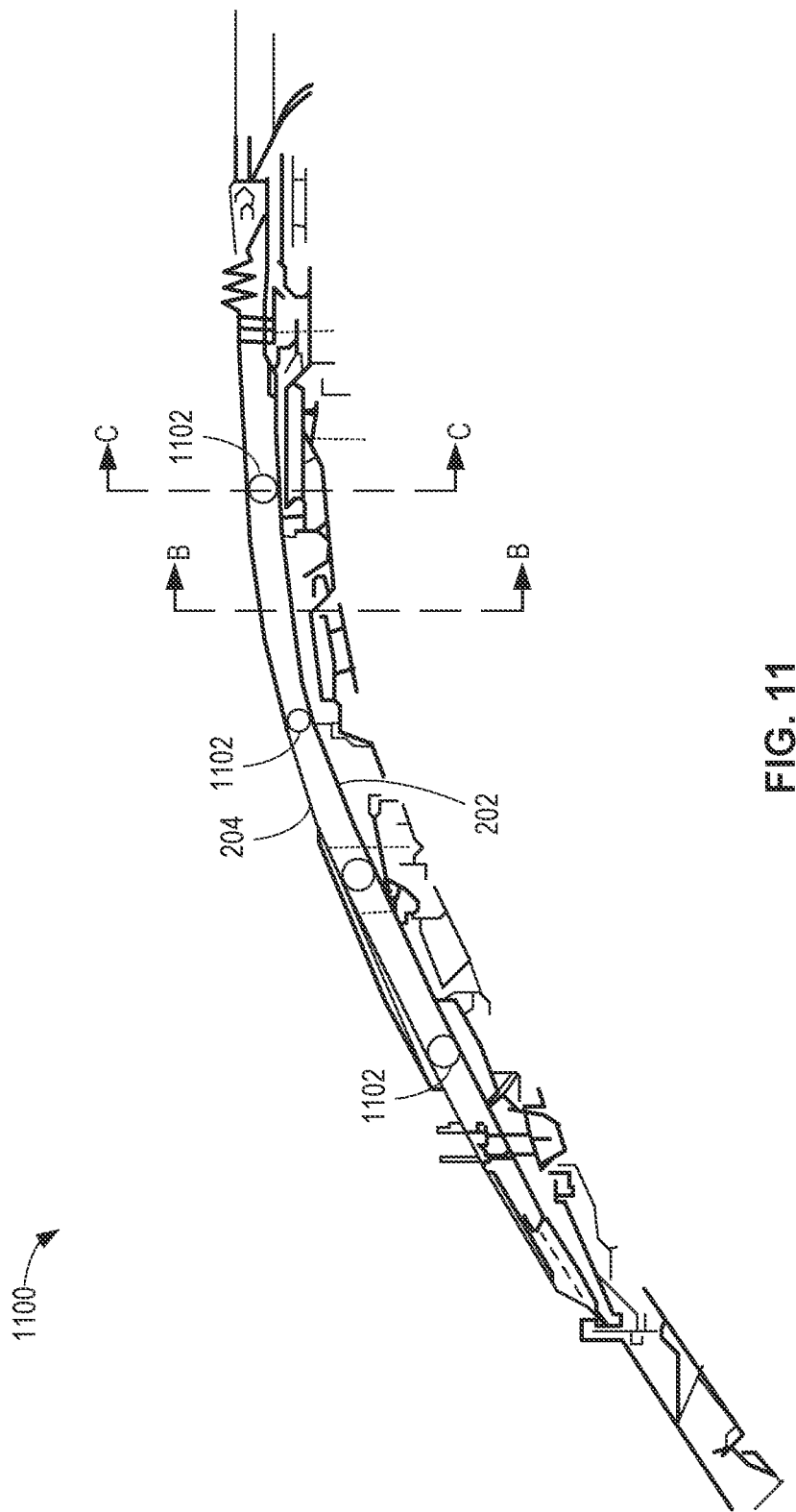
FIG. 11 is a cross-sectional view of an example engine casing that can be implemented in examples disclosed herein.

FIG. 11 is a cross-sectional view of an example casing 1100 (e.g., a double wall casing 09 of FIG. 1) that can be implemented in examples disclosed herein. In some examples, the casing 1100 can include the airfoils and/or the sealing configurations described in FIG. 3. In general, the example casing 1100 can have a flow passage positioned between the casing walls or any other double wall structure (e.g., airfoil) described in current disclosure. In particular, the flow between casing walls 202, 204 can be used to cool and/or heat the casing 1100 or to deliver the cooling/heating flow elsewhere. The example casing 1100 has example sealing configurations 1102. The example casing 1100 of FIG. 11 is similar to the example strut fairing 300 of FIGS. 3, 4, and 5, but, instead, the casing 1100 includes multiple sealing configurations 1102 distributed (e.g., dispersed) throughout the inner wall 202 and the outer wall 204 of the casing 1100 (e.g., cooled casing).

Figure 12:
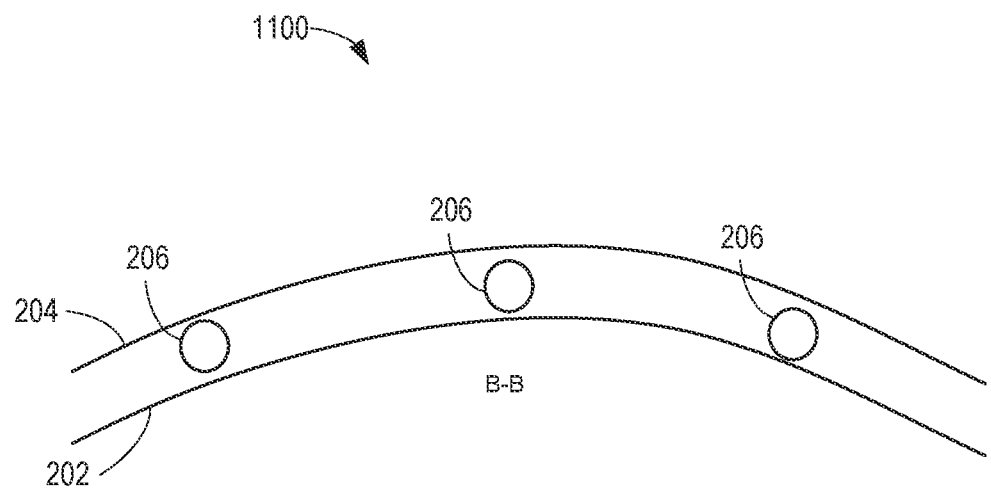
FIGS. 12-14B are top views of the example airfoil section of FIG. 11.

FIG. 12 is a cross-sectional view of the example casing 1100 of FIG. 11 taken along a plane B-B as shown in FIG. 11. In this example, the casing 1100 is depicted with a plurality of bodies 206 traversing the walls 202 and 204 in a first direction that is substantially perpendicular to the walls 202 and 204.

Figure 13:
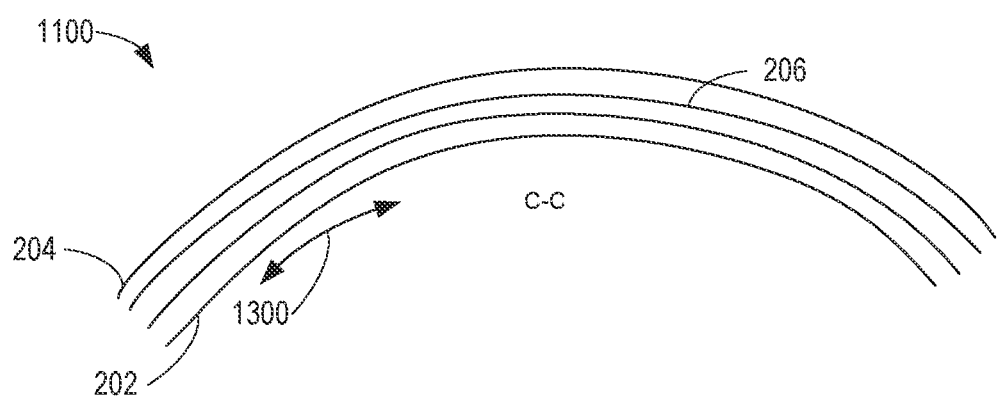

FIG. 13 is a cross-sectional view of the example casing 1100 of FIG. 11 taken along a plane C-C as shown in FIG. 11. In this example, the casing 1100 is depicted with the body 206 extending in a second direction that follows a curve of the walls 202 and 204, as generally indicated by an arrow 1300.

Figure 14A:
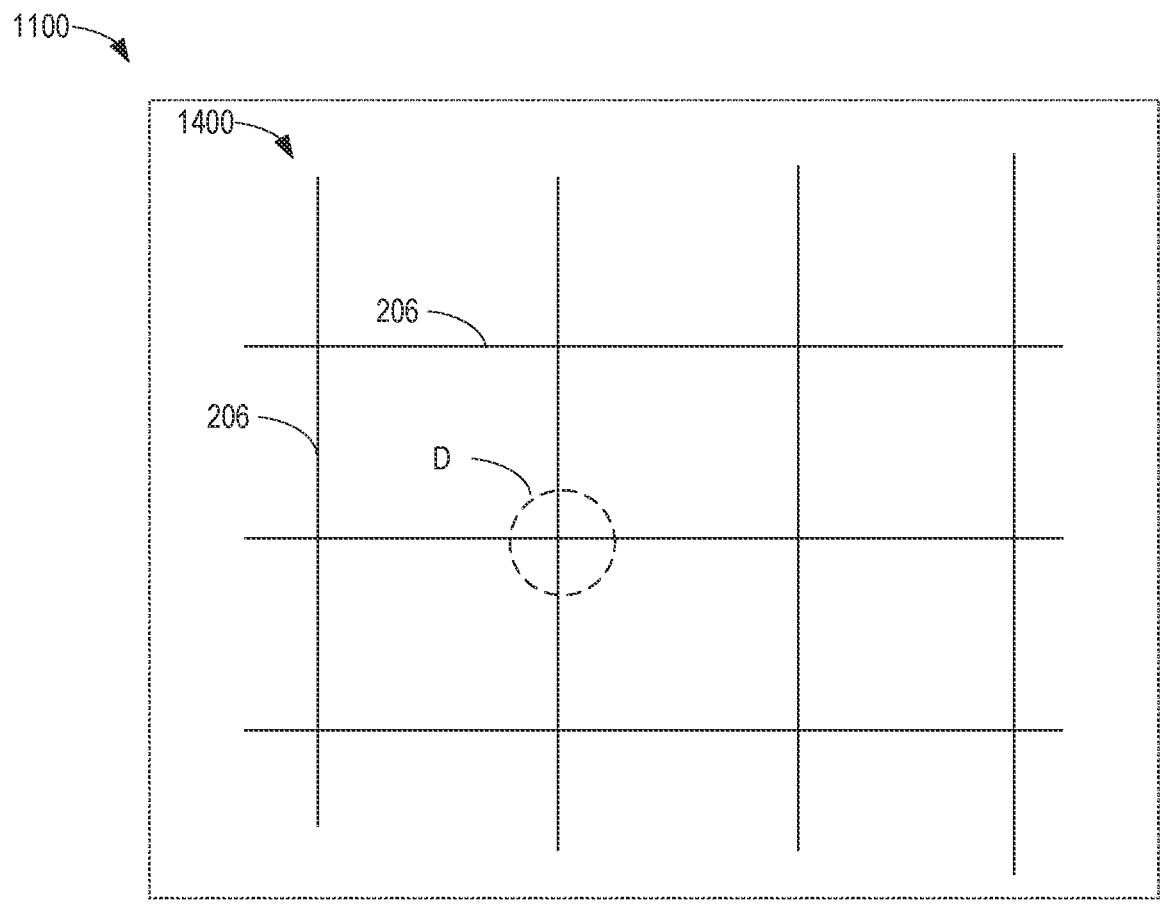
Figure 14B:
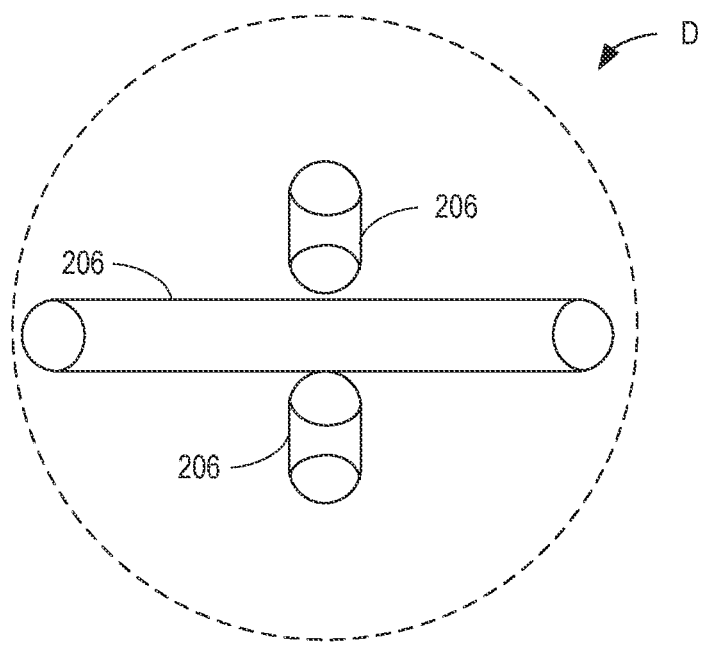

FIGS. 14A-14B are top views of the casing 1100 as shown in FIG. 11. In the example casing 1100 of FIGS. 11-14B, the plurality of bodies 206 are arranged in a pattern (e.g., grid pattern, array, etc.) 1400 as illustrated in FIGS. 14A and 14B. FIG. 14A is a perspective view of the pattern 1400. FIG. 14B is a detailed view of view D of the pattern 1400 as shown in FIG. 14A. The bodies 206 extending in a first direction, as shown in FIG. 12, intersect the bodies 206 extending in a second direction, as shown in FIG. 13.

The examples of FIGS. 4-14B illustrate various engine parts in which partition damper seal configurations can be implemented in accordance with the teachings of the present disclosure. Accordingly, the various engine parts illustrated in FIGS. 4-14B utilize sealing configurations to provide for a sealing function and/or a damping function for segmented internal hardware of an aircraft (e.g., an aircraft engine, aircraft engine casing, etc.). In the example engine parts of FIGS. 4-14B, a sealing configuration, a damper, and structures associated therewith provide sealing of a flow passage in the engine's hardware.

Although each example engine part disclosed above has certain features, it should be understood that it is not necessary for a particular feature of one example airfoil to be used exclusively with that example. Additionally or alternatively, although each example sealing configuration disclosed above has certain features, it should be understood that it is not necessary for a particular feature of one example sealing configuration to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the example strut fairing 300, the example airfoil 600, or casing 1100 includes means for sealing the flow passage, such as the flow passage 216. For example, the means for sealing (e.g., the sealing means) may be implemented by example sealing configurations 200, 402, 700, 800, 900, 1000, 1102. In some examples, the means for sealing may be implemented by bodies 206 and/or the ribs 1002, 1004, 1006.

In some examples, at least one of the inner wall 202 or the inner wall 908 includes first wall means. In some examples, at least one of the outer wall 204 or the outer wall 904 includes second wall means.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example systems, methods, apparatus, and articles of manufacture have been disclosed that provide partition damper seal configurations for segmented internal cooling hardware. In examples disclosed herein, a sealing configuration, a damper, and/or structures associated therewith provide sealing of a flow passage in the engine's hardware and provide a damping function to hold surfaces of a component intact. In examples disclosed herein, cooling of the hardware may enable use of higher temperatures in the engine cycle. In examples disclosed herein, lower grade materials can be utilized in the engine. Further, in examples disclosed herein, the seal can be printed integrally via additive manufacturing, thereby reducing assembly costs and providing sealing in complex geometries. Accordingly, examples disclosed herein enable increased life of an engine, mitigate high vibrations, and reduce high thermal gradients between components of an engine's hardware.

Further aspects of the present disclosure are provided by the subject matter of the following clauses:

An airfoil, comprising an inner wall and an outer wall, the outer wall spaced apart from the inner wall in a radial direction, a space between the inner and outer walls defining a flow passage, and a body positioned between the inner and outer walls, the body traversing the inner and outer walls in an axial direction and attached to an inner surface of the outer wall and an outer surface of the inner wall, the body to detach from the inner and outer surfaces and to at least partially seal the flow passage in response to the outer wall moving relative to the inner wall.

The airfoil of any preceding clause, further including a first notch on the inner surface and a second notch on the outer surface, the first notch opposing the second notch.

The airfoil of any preceding clause, wherein the body is positioned between the first and second notch.

The airfoil of any preceding clause, wherein the body contacts the first and second notches to seal the flow passage in response to the outer wall moving relative to the inner wall.

The airfoil of any preceding clause, wherein the body is a rib disposed on at least one of the inner surface or the outer surface.

The airfoil of any preceding clause, wherein the rib is a first rib, the first rib positioned on a surface opposing a second rib and a third rib.

The airfoil of any preceding clause, wherein at least one of the second or third ribs contacts the first rib to seal the flow passage in response to the outer wall moving relative to the inner wall.

The airfoil of any preceding clause, further including apertures extending through the inner and outer wall, the apertures connected to the flow passage.

The airfoil of any preceding clause, wherein the body is a damping mechanism between the inner and outer walls.

The airfoil of any preceding clause, wherein the outer wall moving relative to the inner wall is due to a thermal expansion of the airfoil.

The airfoil of any preceding clause, wherein the body is a three-dimensional (3D) printed wire, the 3D wire printed via an additive manufacturing (AM) process, the 3D printed wire integral to the inner and outer surfaces.

The airfoil of any preceding clause, further including a plurality of bodies arranged in a grid pattern distributed between the inner and outer walls, the plurality of bodies to detach from the inner and outer surfaces and to seal the flow passage in response to the outer wall moving relative to the inner wall.

An engine casing comprising an inner wall and an outer wall, the outer wall spaced apart from the inner wall in a radial direction, a space between the inner and outer walls defining a flow passage, and a body positioned between the inner and outer walls, the body traversing the inner and outer walls in an axial direction and attached to an inner surface of the outer wall and an outer surface of the inner wall, the body to detach from the inner and outer surfaces and to at least partially seal the flow passage in response to the outer wall moving relative to the inner wall.

The engine casing of any preceding clause, further including and first notch on the inner surface and second notch on the outer surface, the first notch opposing the second notch.

The engine casing of any preceding clause, further including the body positioned between the first and second notch.

The engine casing of any preceding clause, wherein the body contacts the first and second notches to seal the flow passage in response to the outer wall moving relative to the inner wall.

The engine casing of any preceding clause, wherein the body is a damping mechanism between the inner and outer walls.

The engine casing of any preceding clause, wherein the outer wall moving relative to the inner wall is due a thermal expansion of the casing.

The engine casing of any preceding clause, further including a plurality of bodies arranged in an array distributed between the inner and outer walls, the plurality of bodies to detach from the inner and outer surfaces and to seal the flow passage in response to the outer wall moving relative to the inner wall.

An engine casing comprising a first wall means and a second wall means, the second wall means spaced apart from the first wall means, a space between the first and second wall means defining a flow passage, and means for sealing the flow passage, the sealing means traversing the first and second wall means in an axial direction and attached to an inner surface of the second wall means and an outer surface of the first wall means, the sealing means to detach from the inner and outer surfaces in response to the second wall means moving relative to the first wall means.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An airfoil, comprising:
   an inner wall and an outer wall, the outer wall spaced apart from the inner wall in a radial direction, a space between the inner and outer walls defining a flow passage; and
   a body positioned between the inner and outer walls, the body traversing the inner and outer walls in an axial direction, the body attached to an inner surface of the outer wall via a first ligament and an outer surface of the inner wall via a second ligament, the body detachable from the inner and outer surfaces and to at least partially seal the flow passage, the outer wall movable relative to the inner wall.

2. The airfoil of claim 1, further including a first notch on the inner surface and a second notch on the outer surface, the first notch opposing the second notch.

3. The airfoil of claim 2, wherein the body is positioned between the first and second notch.

4. The airfoil of claim 3, wherein the body is in contact with the first and second notches to seal the flow passage.

5. The airfoil of claim 1, wherein the body is detachably coupled to the inner surface via the first ligament and the outer surface via the second ligament.

6. The airfoil of claim 1, wherein the axial direction is a first axial direction, wherein the body is positioned between walls of a strut fairing, the body extending along a second axial direction of the walls of the strut fairing.

7. The airfoil of claim 6, wherein the walls of the strut fairing include the inner wall and the outer wall, further including a plurality of bodies to seal the flow passage.

8. The airfoil of claim 1, further including apertures extending through the inner and outer wall, the apertures connected to the flow passage.

9. The airfoil of claim 1, wherein the body is a damper between the inner and outer walls.

10. The airfoil of claim 1, wherein the outer wall moving relative to the inner wall is due to a thermal expansion of the airfoil.

11. The airfoil of claim 1, wherein the body is a three-dimensional (3D) printed wire, the 3D printed wire separating the inner and outer surfaces.

12. The airfoil of claim 1, further including a plurality of bodies distributed between the inner and outer walls, the plurality of bodies to detach from the inner and outer surfaces and to seal the flow passage.

13. An engine casing comprising:
    an inner wall and an outer wall, the outer wall spaced apart from the inner wall in a radial direction, a space between the inner and outer walls defining a flow passage; and
    a body positioned between the inner and outer walls, the body traversing the inner and outer walls in an axial direction, the body attached to an inner surface of the outer wall via a first ligament and an outer surface of the inner wall via a second ligament, the body detachable from the inner and outer surfaces and to at least partially seal the flow passage, the outer wall movable relative to the inner wall.

14. The engine casing of claim 13, further including a first notch on the inner surface and a second notch on the outer surface, the first notch opposing the second notch.

15. The engine casing of claim 14, further including the body positioned between the first and second notch.

16. The engine casing of claim 15, wherein the body is in contact with the first and second notches to seal the flow passage.

17. The engine casing of claim 13, wherein the body is a damper between the inner and outer walls.

18. The engine casing of claim 13, wherein the outer wall moving relative to the inner wall is due to a thermal expansion of the casing.

19. The engine casing of claim 13, further including a plurality of bodies distributed between the inner and outer walls, the plurality of bodies to detach from the inner and outer surfaces and to seal the flow passage.

20. An engine casing comprising:
    a first wall means and a second wall means, the second wall means spaced apart from the first wall means, a space between the first and second wall means defining a flow passage; and means for sealing the flow passage, the sealing means traversing the first and second wall means in an axial direction, the means for sealing attached to an inner surface of the second wall means via a first ligament and an outer surface of the first wall means via a second ligament, the sealing means detachable from the inner and outer surfaces, the second wall means movable relative to the first wall means.

\* \* \* \* \*